United States Patent Office 3,792,180
Patented Feb. 12, 1974

3,792,180
ADDING FAT ADJUVANTS TO FOODS IN AN EBULLIENT FREEZANT
Kavsy D. Dastur, Yorklyn, Del., assignor to E. I. du Pont de Nemours and Company, Wilmington, Del.
No Drawing. Filed July 30, 1971, Ser. No. 167,835
Int. Cl. A23 1/00
U.S. Cl. 426—524                                         3 Claims

ABSTRACT OF THE DISCLOSURE

A process for adding food adjuvants to foods which comprises contacting the surface of the foods with a dispersion of the food adjuvant in a saturated fluorinated liquid chlorohydrocarbon freezant having a normal boiling point of 5° C. to −50° C.

BACKGROUND OF THE INVENTION

(1) Field of the invention

This invention relates to a process for adding adjuvants to food, e.g., to improve their color or flavor, by contacting the food directly with a dispersion of the adjuvant in an ebullient liquid, saturated fluorinated chlorohydrocarbon freezant such as dichlorodifluoromethane.

(2) Description of the prior art

The freezing or chilling of foods to preserve them is old in the art and the means for effecting such freezing or chilling is quite varied. A common commercial process of freezing food is by exposure in a tunnel air blast freezer wherein the food is passed in a continuous manner through chilled air in a tunnel. Normally the chilled air is blown over the food to hasten freezing.

More modern means of food freezing comprise directly contacting the food with liquid chillants and ebullient freezants. These liquids permit the rapid chilling or freezing of foods of all types due to excellent heat transfer from the food to the freezing medium. Such processes are considerably faster than the tunnel freezing process.

It has been recognized in the art for some time that it is often desirable to add to the foods which are to be frozen various food adjuvants which will contribute to improved flavor, color and storage stability of the frozen foods. Art processes teach that such adjuvants can be added to the foods before freezing by the tunnel process or after freezing. Benson for example in U.S. Pat. 3,398,001 teaches the prevention of oxidative degradation in cut avocados by dipping avocado slices in aqueous solutions of antioxidants such as ascorbic acid before freezing. Hirstensteiner in U.S. Pat. 3,404,989 teaches a similar process for glazing and simultaneously preserving foods by dipping them in an aqueous solution of an antioxidant prior to freezing. A novel process has now been discovered whereby adjuvants can be added to the food products during the actual direct contact freezing of these food products with an ebullient saturated liquid fluorinated chlorohydrocarbon such as dichlorodifluoromethane.

SUMMARY OF THE INVENTION

This invention is directed to a process for adding desirable adjuvants to food products during the actual freezing of said food products. This is accomplished by contacting the surface of the food with a dispersion of the desired food adjuvant in a saturated fluorinated liquid chlorohydrocarbon freezant which has a normal boiling point of from 5° C. to −50° C.

DESCRIPTION OF THE INVENTION

It has been discovered that food adjuvants which are normally essentially insoluble in ebullient dichlorodifluoromethane freezant, such as flavors, odorants, preservatives, surfactants and fats can be dispersed in dichlorodifluoromethane freezant and transferred to food by direct contact therewith. By regulation of the mode of contact between the food and the freezant, the amount of adjuvant distributed to the food surfaces can be readily controlled.

The specific dichlorodifluoromethane direct contact freezing device in which the process of this invention is carried out is not critical, but it is preferably carried out in the devices of Waldin U.S. Pats. 3,479,833, 3,482,412, 3,486,345 and 3,498,069 and U.S. patent application Ser. No. 806,599 to Alaburda et al. These patents employ freezing devices comprising a freezing vessel and a condenser and operate at atmospheric pressure. The direct contact of food and dichlorodifluoromethane therein is carried out either by dropping the food particles into a pan of the liquid freezant, passing the food particles under cascading sprays of the liquid freezant or both.

The manner of deposition of the dispersed materials on food surfaces is, in the main, different from that one would expect from a true solution. It appears that particles once deposited on food tend largely not to be entirely removed on further contact with fresh freezant as would be the case were the dispersed material truly soluble in the freezant. Since deposition occurs for the most part on evaporation to dryness or nearly to dryness of the freezant on the food surfaces there is given a means for controlling the amount of deposition on the surface of the food. Although the mechanism of deposition is not clearly understood and is thought to be related to a sorbtion process, and it is known that when one freezes food by contact with a dispersant/freezant mixture by regulating the flow of freezant so that the freezant evapoartes from the food surfaces at about the rate at which it is added, maximum deposition of dispersed materials results. On the other hand, should one immediately immerse or float the food in a large amount of freezant and in this manner extract from the food all the heat that is to be extracted, then a minimum amount of deposition will occur. It follows therefore that by adjustment of the freezing conditions described above, a wide range of adjuvant deposition can be obtained. The amount of deposition will vary with the concentration of the dispersed material. It is, however, generally observed that the amount of deposition is not linearly proportional to the concentration under all conditions due to the role played by the manner of freezant-food direct contact.

As applied to freezing devices of Waldin for example, when both a pan and sprays are used for direct food-freezant contact, it follows from the above-described principles that the ratio of residence time in the liquid freezant-containing pan to the residence time under the freezant sprays controls to a great extent the amount of adjuvant deposition. Maximum deposition is obtained when the residence time in the pan is very short or even zero, i.e., there is no pan at all, and most of the heat is extracted from the food under slow-flowing sprays. The amount of deposition could thus be readily adjusted by one skilled in the art simply by varying the residence time of the food as it contacts the adjuvant containing freezant in either the pan or spray or both. Similar adjustments of residence or exposure time could be made when using other freezing devices to control the amount of adjuvant deposition.

Since a vast percentage of most deposited adjuvants would not be removed by further contact with freezant, should one find that sufficient deposition has occurred during an early stage of freezing contact, further spray contact with non-adjuvant containing freezant can often be permitted to remove residual heat in the latter stages of the process.

metane, 10% ethanol, and 1% butylated hydroxyanisole[1] by weight was prepared by dissolving the anisole in the ethanol and pouring the resultant solution into the ebullient dichlorodifluoromethane.

A pork chop was frozen by floating it in the ebullient freezant mixture for 8 minutes.

On removal from the freezant and after the dichlorodifluoromethane had evaporated from the surface, the pork chop was washed with 200 ml. ethanol. The ethanol solution gave a strong positive test for the antioxidant on addition of Ehrlich's Reagent, according to Test No. 26.107 (c) of the Official Methods of Analysis of the Association of Official Agricultural Chemists, p. 444 (1965).

Example 3

This example demonstrates, in accordance with this invention, the addition of an insoluble antioxidant to food via dichlorodifluoromethane freezant with the assistance of a surface active agent and in the absence of ethanol. The freezant contacted the food only in the form of sprays, i.e., there was no contact with bulk freezant as for example in a pan as in Example 1.

The antioxidant used in the tests was butylated hydroxyanisole hereinafter called BHA. BHA consists of mixed 2- and 3-tert. butyl-4-methoxyphenol and is listed as a food additive in Handbook of Food Additives, Chemical Rubber Company, Cleveland, Ohio (1968) p. 219. The surfactant employed was "Atmos" 300, a commercial product consisting essentially of mono-, di-, and tri-glycerides and sold by Atlas Chemical Industries, Wilmington, Delaware.

"Atmos" 300 hereinafter called the surfactant is reported by the manufacturer to contain at least 46% α-monoglycerides of fatty acids, at least 6.9% β-monoglycerides of fatty acids, about 34% di- and tri-glycerides of fatty acids, at most 1% free fatty acids as oleic, at most 11% 1,2-propylene glycol, and traces of preservatives consisting of butylated hydroxanisole described above and butylated hydroxytoluene. Percentages are by weight and the fatty acids are of animal origin.

BHA, the antioxidant, was added to the surfactant in an amount such that Ehrlich solution test for phenolic hydroxyl groups indicated a concentration in the mixture of 0.1% by weight. The Ehrlich solution test was the same as that of Example 2.

In this example, the mixture of surfactant and antioxidant was melted and poured in a thin stream into ebullient dichlorodifluoromethane freezant. Since the mixture is soluble in room temperature dichlorodifluoromethane, stock solutions could have been prepared in a pressure cylinder as described above. On pouring the melted mixture into ebullient dichlorodifluoromethane or on adding the liquid phase from the pressure cylinder, to ebullient dichlorodifluoromethane, a fine dispersion results. Food was frozen by contact with the above-described dispersions.

The freezing device contacted the food with freezant only by spraying and had a capacity for freezing about 200 pounds (91 kg.) of food per hour with a 20 minute contact time. The device employed a 200 pound (91 kg.) initial charge of freezant.

The procedure of the tests consisted in preparing first a freezant dispersion in the freezing device as described above, then operating the device to freeze 50 pounds of breaded chicken parts at the rate of about 200 pounds per hour, then adding additional surfactant/antioxidant mixture to produce a higher concentration and freezing an additional 50 pounds of chicken parts. The steps were repeated until six levels of concentration had been tested.

Ten chicken parts from each lot were removed at random for analysis from a belt which exited from the device. The analysis consisted, after weighing the parts, in scraping the breading from the parts—which amounted to about 10% by weight of the pieces—extracting the surfactant/antioxidant mixture with 1,1,2-trichloro-1,2,2-trifluoroethane and, transferring to dilute ethanol and therein determining the amount of antioxidant present by the Ehrlich test and by colorimetric comparison with known solutions.

The amount of surfactant-antioxidant in the freezant was estimated by weighing the residue from evaporation of a filtered 1,1,2-trichloro-1,2,2-trifluoroethane extract of the residue left from evaporation of a measured volume of freezant.

The fatty composition of the surfactant mixture was seen to have been deposited on the chicken parts as tiny evenly distributed globules. As both the surfactant mixture and the antioxidant are essentially insoluble in the freezant, and are together in the same fatty disperse phase, the two components were simultaneously deposited on the food.

The results were the following:

TABLE III

Surfactant-antioxidant conc. in the freezant (percent by wt.).

| Surfactant-antioxidant conc. in the freezant (percent by wt.) | BHA found on the chicken parts (p.p.m. by weight based on the total wt. of the part) |
|---|---|
| 0.53 | 0.032 |
| 0.90 | 0.150 |
| 1.53 | 0.247 |
| 2.35 | 0.250 |
| 3.72 | 0.850 |
| 7.23 | >4.4 |

As is seen in the above table, the amount of deposition varies in the lower ranges more or less directly with concentration in the freezant. However, at high concentrations deposition is proportionately much higher.

The presence of the surfactant on the food should be useful in preparing protective food coatings.

Example 4

This example demonstrates the uniform addition of surfactant-dispersed fat via the freezant to breaded chicken thighs, thus contributing to the cold storage stability of the parts.

Additives as shown in Table IV were dispersed in the freezant as in Example 3. When chicken fat alone was added to the freezant it was melted and poured into ebullient agitated dichlorodifluoromethane. When surfactant ("Atmos" 300 as described under Example 3) and fat were added, the components were melted together before addition to the freezant.

The breading used in the experiment was one commonly used in the trade comprising corn flour, wheat flour, salt, nonfat milk solids, dry egg and various flavors including herbs.

The process of the invention is operable with the above-described breading. However, results are even better when carboxymethyl cellulose or a polysaccharide is incorporated into the breading.

The breaded chicken parts were steam cooked before freezing. The parts were frozen by floating in pure freezant dichlorodifluoromethane or freezant containing additives as indicated below.

After freezing, the parts were subjected to an accelerated freezer storage test which consisted in exposing the parts to a −40° F. (−20° C.) 1600 ft. (488 M)/min. air blast for 15 hours. Thereafter the parts were fried for 4.5 minutes in 350° F. (199° C.) cooking oil and examined for white spots which are presumably caused by freezer dehydration.

The results are shown in Table IV wherein the numbers cited correspond to the estimated whitened areas in percent of the total area of the part. Three chicken thighs were exposed to each condition.

---

[1] Edible antioxidant sold as "Tenox" BHA by Eastman Chemical Products Inc., 260 Madison Ave., New York, N.Y.

TABLE IV

| Breading additive | Freezant additive | | | |
|---|---|---|---|---|
| | None | 3% chicken fat | 2% surfactant, 1% chicken fat | 3% surfactant |
| None | 0, 2, 2 | 10, 10, 5 | 0, 0, 0 | 5, 5, 5 |
| 1% carboxymethylcellulose [1] | 0, 1, 1 | 5, 20, 20 | Trace, trace, trace | 1, 1, 2 |
| 3% carboxymethylcellulose | 1, 1, 1 | 5, 5, 15 | 0, 0, 0 | 1, 1, 2 |
| 5% carboxymethylcellulose | 1, 1, 0 | 5, 10, 10 | 0, 0, trace | 1, 1, 2 |
| 1% polysaccharide [2] | 2, 5, 0 | 30, 30, 20 | 1, 1, trace | 2, 2, 5 |
| 3% polysaccharide | 2, 1, 1 | 10, 15, 15 | 0, 0, 0 | 1, 0, 0 |

[1] Food grade, sold by E. I. du Pont de Nemours and Co., Wilmington, Del. under the designation CMC P-75 F-H.
[2] "Keltrol" xanthan gum high molecular weight linear polysaccharide sold by the Kelco Company, 75 Terminal Ave., Clark, N.J.

As is seen from Table IV above, chicken fat alone does not provide protection to the chicken. In fact it appears that added fat seems rather to disturb the breading in such a way as to increase the proportion of unprotected areas. The omission of surfactant is therefore not indicated in this embodiment although in other embodiments, for example in adding fat (margarine) to vegetable as in Example 1, a surfactant is not needed.

Example 5

This example demonstrates the transfer to food of propyl-p-hydroxybenzoate dispersed in freezant dichlorodifluoromethane. Propyl-p-hydroxybenzoate is a well-known anti-microbial agent often used with foods.

39 grams of propyl-p-hydroxybenzoate were dissolved in 150 ml. ethanol and the resultant solution was poured into 3 liters of agitated ebullient dichlorodifluoromethane.

190 grams of fresh green beans were frozen by floating them in the dispersion for 35 seconds. Thereafter they were suspended in the vapors over the freezant for 60 seconds, experience having shown that this procedure reduces the average temperature of the beans to 0° F. (−18° C.), the usual storage temperature.

The frozen beans were transferred to 100 ml. of ethanol and were allowed to stand with occasional stirring for five minutes. Thereafter the extract was hydrolyzed by refluxing for two hours with 5 ml. of 0.5 N potassium hydroxide in ethanol. After concentration to less than 25 ml. total volume, the solution was diluted with deionized water, acidified with N sulfuric acid and saturated with ammonium sulfate. The ether solution resulting from three-fold ether extraction was tested for p-hydroxybenzoic acid using Millon's Reagent according to the procedure of Edwards et al., Analyst 62 178 (1937) (c.f. Cox et al., Chemical Analysis of Food, Chemical Publishing Co., New York, N.Y. (1962) p. 87).

The test solution turned to a deep purplish red color in less than 5 minutes whereas a test solution from beans frozen in pure dichlorodifluoromethane gave no red color at all, indicating the presence of p-hydroxybenzoic acid in the former case and its absence in the latter case.

The foregoing detailed description has been given for clarity of understanding only and no unnecessary limitations are to be understood therefrom. The invention is not limited to exact details shown and described for obvious modifications will occur to one skilled in the art.

The embodiments in which an exclusive property or privilege is claimed are defined as follows:

I claim:

1. A process for adding a food adjuvant to food which comprises directly contacting the surface of the food with a dispersion of the food adjuvant in ebullient dichlorodifluoromethane freezant wherein the food adjuvant consists essentially of
   at least 46 weight percent α-monoglycerides of fatty acids,
   at least 6.9 weight percent β-monoglycerides of fatty acids,
   about 34 weight percent di- and triglycerides of fatty acids taken together,
   0–1 percent free fatty acid,
   0–11 percent 1,2-propyleneglycol, and
   traces of butylated hydroxyanisole and butylated hydroxytoluene.

2. The process according to claim 1 wherein the food is directly contacted with the adjuvant-freezant dispersion by floating the food in said dispersion.

3. The process according to claim 1 wherein the food is directly contacted with the adjuvant-freezant dispersion by spraying the food with said dispersion.

References Cited

UNITED STATES PATENTS

| 3,486,345 | 12/1969 | Waldin | 99—198 |
| 3,416,977 | 12/1968 | Rein | 62—64 |
| 3,440,831 | 4/1969 | Thompson | 62—64 |
| 2,419,877 | 4/1947 | Birdseye | 99—195 |
| 3,035,985 | 5/1962 | Stoyle | 99—166 |
| 3,398,001 | 8/1968 | Benson | 99—193 |
| 3,136,692 | 6/1964 | Backinger | 99—198 |
| 2,211,153 | 8/1940 | Noyes | 99—198 |

NORMAN YUDKOFF, Primary Examiner

H. H. BERNSTEIN, Assistant Examiner